(12) United States Patent
Li (10) Patent No.: US 12,443,204 B2
(45) Date of Patent: Oct. 14, 2025

(54) GIMBAL CONTROL METHOD, CONTROLLER, UNMANNED AERIAL VEHICLE AND UNMANNED AERIAL VEHICLE INSPECTION SYSTEM

(71) Applicant: AUTEL ROBOTICS CO., LTD., Shenzhen (CN)

(72) Inventor: Weiheng Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 43 days.

(21) Appl. No.: 18/506,426

(22) Filed: Nov. 10, 2023

(65) Prior Publication Data
US 2024/0255964 A1   Aug. 1, 2024

(30) Foreign Application Priority Data
Nov. 11, 2022   (CN) .......................... 202211415533.7

(51) Int. Cl.
*G05D 1/689* (2024.01)
*G05D 1/24* (2024.01)
*G05D 105/80* (2024.01)
*G05D 109/20* (2024.01)
*G05D 111/30* (2024.01)

(52) U.S. Cl.
CPC ............... *G05D 1/689* (2024.01); *G05D 1/24* (2024.01); *G05D 2105/80* (2024.01); *G05D 2109/20* (2024.01); *G05D 2111/32* (2024.01)

(58) Field of Classification Search
CPC ...... G05D 1/689; G05D 1/24; G05D 2109/20; G05D 2105/80; G05D 2111/32
USPC .......................................................... 701/3
See application file for complete search history.

(56) References Cited

U.S. PATENT DOCUMENTS

2019/0333394 A1   10/2019   Pastre et al.
2021/0150917 A1*   5/2021   Kubie .................... G05D 1/689
2021/0173396 A1*   6/2021   Zhang .................. H04N 23/632
(Continued)

FOREIGN PATENT DOCUMENTS

| CN | 105628045 A | 8/2021 |
|---|---|---|
| CN | 113805607 A | 12/2021 |
| WO | WO2019000404 A1 | 1/2019 |

OTHER PUBLICATIONS

The First Chinese Office Action dated May 31, 2025; Appln. No. 20221141553.7 with English Translation (machine).

*Primary Examiner* — Mahmoud S Ismail
(74) *Attorney, Agent, or Firm* — Frank Gao, Esq.

(57) ABSTRACT

The present disclosure relates to the field of unmanned aerial vehicles (UAV), and discloses a gimbal control method, a controller, an unmanned aerial vehicle and an unmanned aerial vehicle inspection system. The gimbal control method, applied to a UAV, acquires inspection information about the UAV, including an observation flight leg, an observation interval corresponding to the observation flight leg, a total flight range corresponding to the observation interval and the current flight range. Then, the observation progress of the UAV is determined according to the current flight range and the total flight range. A first position, position of center point of the field of view of the nacelle of UAV, is determined according to the observation progress and the observation interval. Finally, the angle of the gimbal of the UAV is controlled according to the first position and the current position of the UAV.

14 Claims, 6 Drawing Sheets

(56) References Cited

U.S. PATENT DOCUMENTS

| | | |
|---|---|---|
| 2021/0240185 A1 | 8/2021 | Yang et al. |
| 2022/0137648 A1* | 5/2022 | Huang ................... G05D 1/689 |
| | | 701/3 |
| 2022/0185474 A1* | 6/2022 | Imai ......................... G08G 7/00 |
| 2024/0219930 A1* | 7/2024 | Zhang .................. H04N 23/695 |

\* cited by examiner

GIMBAL CONTROL METHOD, CONTROLLER, UNMANNED AERIAL VEHICLE AND UNMANNED AERIAL VEHICLE INSPECTION SYSTEM

CROSS REFERENCE TO RELATED DISCLOSURE

This application is filed based upon and claims priority to Chinese patent application 202211415533.7, filed on Nov. 11, 2022 and entitled "Gimbal control method, controller, unmanned aerial vehicle and unmanned aerial vehicle inspection system," the entire disclosure of which are incorporated herein by reference for all purposes.

BACKGROUND

An unmanned aerial vehicle (UAV) is an unmanned aircraft with radio remote control equipment and a built-in program to control flight attitude, which is widely used in many fields. Unmanned aerial vehicles have been gradually applied to inspection operations, such as inspection of power transmission equipment, pipelines, and vegetation, personnel can use unmanned aerial vehicles to complete inspection on inspection objects.

Generally, an unmanned aerial vehicle for inspection operations is equipped with a gimbal, and the gimbal is a support equipment for mounting shooting equipment. However, in the process of inspection operation of an unmanned aerial vehicle, the angle of the gimbal is fixed, so that the gimbal is fixedly directed to a certain direction of the unmanned aerial vehicle, namely, the observation direction is fixed, and cannot be automatically adjusted; therefore, there is a risk that the shooting field of view cannot completely cover the inspection object, and a missed detection occurs. In addition, it is necessary to set the angle of the gimbal manually during the inspection process, which not only has a large workload of editing but also affects the efficiency of the inspection.

SUMMARY

The present disclosure relates to the technical field of an unmanned aerial vehicle, and in particular to a gimbal control method, a controller, an unmanned aerial vehicle, and an unmanned aerial vehicle inspection system.

The embodiments of the present disclosure solve at least one of the above-mentioned technical problems to a certain extent, and therefore the present disclosure provides a gimbal control method, a controller, an unmanned aerial vehicle, and an unmanned aerial vehicle inspection system, which can automatically adjust the angle of a gimbal so as to self-adapt to an inspection object, enable a shooting field of view to completely cover the inspection object, effectively avoid the risk of missing an inspection and improve the inspection efficiency.

According to a first aspect of the present disclosure provide a gimbal control method applied to an unmanned aerial vehicle, comprising:

acquiring inspection information of the unmanned aerial vehicle, wherein the inspection information comprises an observation flight leg, an observation interval corresponding to the observation flight leg, a total flight range corresponding to the observation interval, and a current flight range, wherein the observation flight leg is a flight leg used for inspecting the observation interval by the unmanned aerial vehicle;

determining an observation progress of the unmanned aerial vehicle based on the current flight range and the total flight range;

determining a first position according to the observation progress and the observation interval, wherein the first position is a target position of a center point of a field of view of a nacelle of the unmanned aerial vehicle;

controlling an angle of a gimbal of the unmanned aerial vehicle according to the first position and the current position of the unmanned aerial vehicle.

According to a second aspect of the present disclosure provide a controller, comprising:

at least one processor; and, a memory communicatively connected to the at least one processor; wherein, the memory stores instructions executable by the at least one processor, the instructions are executed by the at least one processor to enable the at least one processor to perform the gimbal control method as described above.

According to a third aspect of the present disclosure provide an unmanned aerial vehicle, comprising: a gimbal and a controller of the second aspect for controlling the angle of the gimbal.

According to a fourth aspect, embodiments of the present disclosure provide an unmanned aerial vehicle inspection system, comprising:

several ground monitoring stations and the unmanned aerial vehicle of the third aspect above;

the ground monitoring station is communicatively connected to the unmanned aerial vehicle, and the unmanned aerial vehicle is used for inspecting an observation interval on an observation moving line and transmitting image information about the observation moving line and inspection information acquired during inspection to the ground monitoring station so that the ground monitoring station controls the unmanned aerial vehicle.

BRIEF DESCRIPTION OF THE DRAWINGS

One or more embodiments are illustrated by way of example and not by way of limitation in the figures of the accompanying drawings, in which elements having the same reference numeral designations represent similar elements, and in which the figures are not to scale unless otherwise specified.

FIG. 10 is a block diagram showing the structure of a gimbal control device in some embodiments of the present application;

FIG. 11 is a schematic diagram of the structure of the controller in some embodiments of the present application.

DETAILED DESCRIPTION

In order that the objects, aspects, and advantages of the present disclosure will become more apparent, a more particular description of the disclosure will be rendered by reference to the embodiments thereof which are illustrated in the appended drawings. It should be understood that the particular embodiments described herein are illustrative only and are not limiting. Based on the embodiments of the present disclosure, all other embodiments obtained by a person of ordinary skill in the art without inventive effort fall within the scope of the present disclosure.

It should be noted that various features of the embodiments of the present disclosure may be combined with each other without departing from the scope of the present disclosure. In addition, although functional module partitioning is performed in a schematic diagram of a device, a logical order is shown in a flowchart, in some cases, the steps shown or described may be performed in an order other than the functional module partitioning in the device, or the flowchart. Furthermore, the terms "first", "second", "third", and the like, as used herein, do not limit the scope of the claims to data and the order in which they are performed, but rather distinguish between the same or similar items that perform substantially the same function or function.

The gimbal control method in the embodiment of the present application is applied to an unmanned aerial vehicle. The unmanned aerial vehicle may be any type of unmanned aerial vehicle, such as fixed-wing unmanned aerial vehicle, tilt-rotor unmanned aerial vehicle, rotor unmanned aerial vehicle, parachute-wing unmanned aerial vehicle, flapping-wing unmanned aerial vehicle, etc. Unmanned aerial vehicles can provide a variety of functional service operations, for example, they can be used for aerial photography, inspecting, monitoring, or transportation. In some embodiments, the unmanned aerial vehicle is capable of performing inspection operations on inspection objects (e.g. power transmission equipment, pipelines, vegetation, etc.) to assist personnel in performing inspections on the inspection objects. During the operation of the unmanned aerial vehicle, any type of processor on the unmanned aerial vehicle can perform the gimbal control method provided by the embodiment of the present disclosure, so as to automatically adjust the angle of a gimbal so as to self-adapt to an inspection object, enable a shooting field of view to completely cover the inspection object, effectively avoid the risk of missing an inspection and improve the inspection efficiency.

Taking inspection operation as an example, the application environment of the gimbal control method is described below. Wherein the inspection object can be power transmission equipment, pipelines, roads or vegetation, etc.

Figure 1:
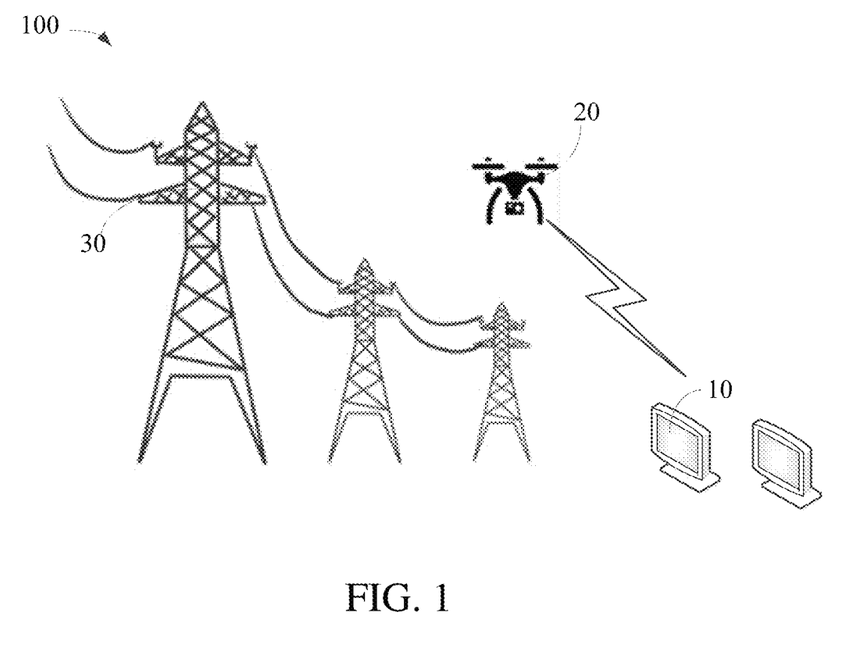
FIG. 1 is an architecture diagram of an unmanned aerial vehicle inspection system applying a gimbal control method provided by some embodiments of the present application.

With reference to FIG. 1, FIG. 1 is an architecture diagram of an unmanned aerial vehicle inspection system applying a gimbal control method provided by embodiments of the present application. As shown in FIG. 1, the unmanned aerial vehicle inspection system 100 includes a plurality of ground monitoring stations 10 and unmanned aerial vehicles 20. The ground monitoring station 10 and the unmanned aerial vehicle 20 are communicatively connected by wireless network communication. The wireless network may be a Bluetooth network, a WiFi network, a wireless cellular network, or a combination thereof, and is not limited thereto.

The ground monitoring station 10 may be an electronic device such as a computer, smartphone, remote control, or tablet computer having computing processing or display capabilities. Here, the ground monitoring station is not limited in any way and may have a calculation processing or display function.

The unmanned aerial vehicle 20 may be any type of powered unmanned flight vehicle including, but not limited to, tilt-rotor unmanned aerial vehicles, fixed-wing unmanned aerial vehicles, parachute-wing unmanned aerial vehicles, flapping-wing unmanned aerial vehicles, and helicopter models. The unmanned aerial vehicle 20 can have a corresponding volume or power according to the requirements of actual situations, so as to provide a load capacity, a flight speed, a flight mileage, and the like which can meet the requirements of use. One or more functional modules may also be added to the unmanned aerial vehicle 20 to enable the unmanned aerial vehicle 20 to realize corresponding functions. In some embodiments, the unmanned aerial vehicle 20 carries a gimbal, which is support equipment for mounting the shooting equipment. Specifically, the shooting equipment or other sensor is housed in a nacelle and mounted on a gimbal. It can be understood by a person skilled in the art that the gimbal can rotate around the X, Y, and Z axes, and when the gimbal adjusts the angle, the nacelle can be driven to adjust the angle so as to change the field of view of the shooting equipment.

The unmanned aerial vehicle 20 comprises at least one controller as a control core of flight and data transmission of the unmanned aerial vehicle and integrates one or more modules so as to perform a corresponding logic control program, for example, executing a gimbal control method provided by an embodiment of the present application.

In some embodiments, inspection object 30 may be a high-voltage power transmission line, wherein the high-voltage power transmission line may comprise a plurality of poles and towers erecting power transmission cables, each pole and tower may correspond to one observation feature point. When the unmanned aerial vehicle is at the observation feature point, the unmanned aerial vehicle may perform shooting and detection on one or more components of the poles and towers (for example, one or more components of an insulator, anti-drop pin, hanging point bolt, shockproof hammer, etc. of the poles and towers). When the unmanned aerial vehicle is between two poles and towers, shooting and detection for multiple transmission cables can be performed.

In this embodiment, the observation moving line may comprise a tower on the entire transmission line and the area where the transmission cables between two adjacent poles and towers are located. The observation interval may be an area where the power transmission cable between two poles and towers is located.

The unmanned aerial vehicle inspection system 100 can perform inspection operations on inspection object 30. The observation moving line may be determined before the inspection object 30 is automatically inspected. The unmanned aerial vehicle 20, when inspecting an observation interval on an observation moving line, transmits image information about the observation moving line and inspection information acquired during inspection to the ground monitoring station 10. Thus, the ground monitoring station 10 can display image information to help the staff know the detection situation of the inspection objects 30 in time. In addition, the operator can control the operation of the unmanned aerial vehicle through the ground monitoring station 10.

It should be noted that the above description is merely exemplary in that the inspection object 30 is a high-voltage power transmission line, and does not impose any limitation on the inspection object. In some embodiments, the inspection object may also be a road, a factory, a farmland, a forest, etc.

It can be understood that during the inspection operation of an unmanned aerial vehicle,—tilt needs to be controlled, and a gimbal control method provided by an embodiment of the present application is performed so as to enable an angle of the gimbal to satisfy scanning and shooting of an inspection object. That is, during the navigation of the unmanned aerial vehicle, the angle of the gimbal can enable the shooting field of view to scan and photograph each observation interval on the observation moving line. When the inspection is completed, all the shooting field of view can completely cover the inspection object, and the image information can reflect various regions of the inspection object.

According to some gimbal control methods known to the inventor of the present application, a fixed gimbal angle is usually set for different destinations or flight legs according to the spatial relationship between the observation moving line and the flight route, so that the gimbal is fixedly directed to a certain direction of the aircraft during the unmanned aerial vehicle performing flight route. That is, the observation direction is fixed and cannot be adjusted automatically.

In this scheme, since the angle of the gimbal is fixed, when the observation moving line fluctuates or a large angle bend occurs, the fixed gimbal angle may not completely cover the inspection object. In this scheme, it is necessary to set a suitable gimbal angle for each destination or flight leg on the observation moving line, especially when the observation moving line is bent or there is a large change in height, the pre-set gimbal angle is difficult to meet the actual situation. In addition, when the observation moving line is too long and there are too many segments, it is very difficult to manually set the observation angle of the gimbal of each flight leg on the flight route, and the operation is time-consuming, and it is also easy to make mistakes, thus affecting inspection efficiency.

In view of the above-mentioned problems, the embodiment of the present application provides a gimbal control method, which is applied to an unmanned aerial vehicle, and acquires inspection information about the unmanned aerial vehicle, wherein the inspection information comprises an observation flight leg, an observation interval corresponding to the observation flight leg, a total flight range corresponding to the observation interval and a current flight range. Then, the observation progress of the unmanned aerial vehicle is determined according to the current flight range and the total flight range. A first position is determined according to the observation progress and the observation interval, wherein the first position is the position of the center point of the field of view of the nacelle of the unmanned aerial vehicle. Finally, the angle of the gimbal of the unmanned aerial vehicle is controlled according to the first position and the current position of the unmanned aerial vehicle. In this embodiment, in an above-mentioned manner, the inspection object is divided into a plurality of observation intervals; for each observation interval, according to the observation progress (flight progress), a first position (a target position of the observation center of the pod) which can fall on the observation interval is calculated in real time; then, the angle of the gimbal of the unmanned aerial vehicle is controlled based on the first position, so as to automatically adjust the angle of the gimbal, so that the adjusted position of the observation center of the nacelle is located at the first position so that the current shooting field of view is adapted to the observation interval. Therefore, when the inspection is completed, the entire shooting field of view can completely cover the inspection object, the inspection object can be self-adaptive, and the inspection object can be completely observed to effectively avoid the risk of missing inspection and improve the inspection efficiency.

From the foregoing, it can be appreciated that the gimbal control method provided by embodiments of the present application can be implemented by an unmanned aerial vehicle that includes a gimbal, e.g. performed by a control chip or processor of the unmanned aerial vehicle or by other computing processing capable devices, etc. Other devices with computing processing capabilities may be ground monitoring stations or intelligent terminals communicatively connected to unmanned aerial vehicles, etc.

Figure 2:
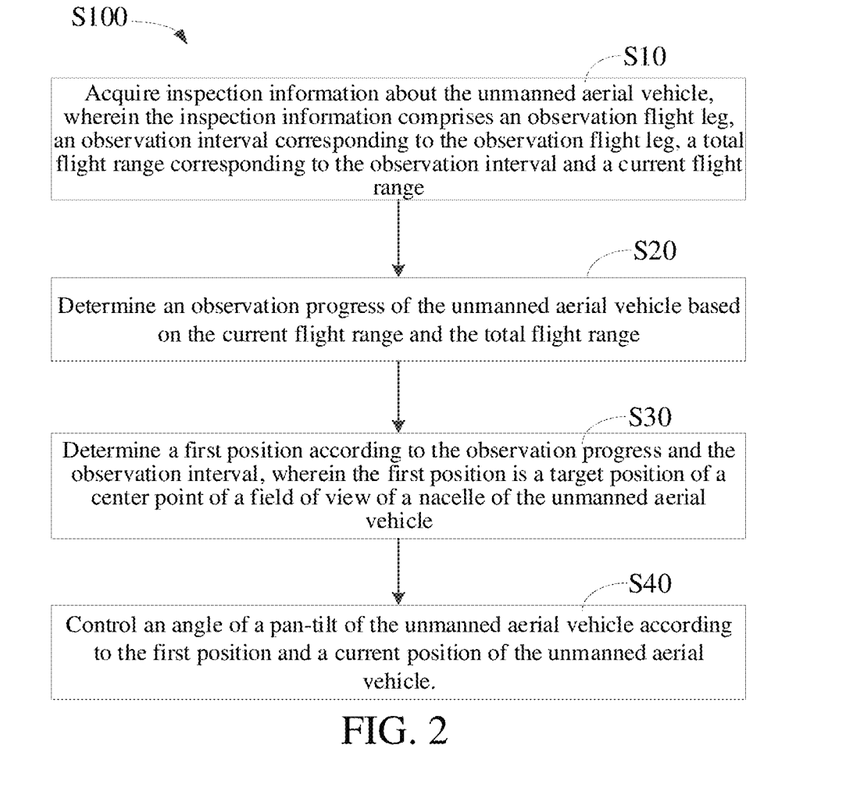
FIG. 2 is a schematic flow chart of a gimbal control method in some embodiments of the present application.

A gimbal control method according to an embodiment of the present application is described below in connection with an exemplary application and implementation of an unmanned aerial vehicle according to an embodiment of the present application. With reference to FIG. 2, FIG. 2 is a schematic flow chart of a gimbal control method provided by embodiments of the present application. It will be appreciated that the subject of performing the gimbal control method may be one or more processors of an unmanned aerial vehicle.

As shown in FIG. 2, the method S100 may specifically include the following steps:

S10: acquiring inspection information about the unmanned aerial vehicle, wherein the inspection information comprises an observation flight leg, an observation interval corresponding to the observation flight leg, a total flight range corresponding to the observation interval, and a current flight range.

the observation flight leg is a flight leg used for inspecting the observation interval by the unmanned aerial vehicle. The observation interval refers to the region between two adjacent observation feature points on the observation moving line. The observation moving line refers to a scanning path of a shooting field of view required for observing an inspection object during an inspection task flight and may comprise a set of three-dimensional spaces composed of observation feature points and connecting lines between the observation feature points. Observation feature points refer to the nodes that constitute the observation moving line in the inspection mission flight.

The observation flight leg and the observation interval have a corresponding relationship, and in some embodiments, one observation interval corresponds to one observation flight leg; In some embodiments, one observation interval corresponds to a plurality of observation flight legs.

The total flight range corresponding to the observation interval refers to the total mileage of at least one observation flight leg corresponding to the observation interval. When the observation area corresponds to an observation flight leg #1, then the total flight range corresponding to the observation interval is the mileage of the observation flight leg #1; When the observation area corresponds to observation flight leg #1 and observation flight leg #2, then the total flight range corresponding to the observation interval is the mileage sum of the two observation flight legs #1 and #2.

The current flight range corresponding to the observation interval refers to the mileage of the total flight of the unmanned aerial vehicle on at least one observation flight leg corresponding to the observation interval. It will be appreciated that, as the unmanned aerial vehicle flies, the current flight range is accumulated until the total flight range is reached and then the next observation interval inspection is started.

Figure 3:
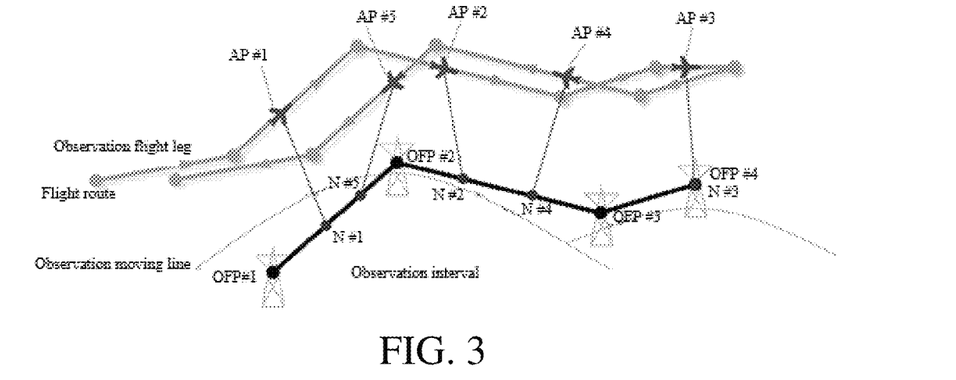
FIG. 3 is a schematic diagram of the inspection of an unmanned aerial vehicle in some embodiments of the present application.

Referring to FIG. 3, an example in which the inspection object is a high-voltage power transmission line will be described. The high-voltage power transmission line may comprise a plurality of poles and towers erecting power transmission cables, each pole and tower may correspond to one observation feature point. A plurality of cables are connected between the poles and towers.

The flight route is above the high-voltage transmission line, and it can be understood that the route is the path taken by the unmanned aerial vehicle when performing the inspection task. The flight route is composed of all observation flight legs. In this embodiment, the observation moving line comprises poles and towers on the entire transmission line and the area of the transmission cable between two adjacent poles and towers. In this embodiment, the observation interval may be the area where the power transmission cable between two poles and towers is located. It will be understood that the observation moving line may be closed or open, and are not intended to be limiting in any way.

Referring again to FIG. 3, the unmanned aerial vehicle needs to observe the whole observation moving line and find out the special situation of the path on the observation moving line in time during the inspection flight. Thus, as the unmanned aerial vehicle flies, the field of view of the shooting equipment within the nacelle (field of view of a nacelle) needs to sweep over the entire observation moving line, rather than just over certain areas on the observation moving line, or only over observation feature points (OFP is illustrated in FIG. 3) on the observation moving line. In order to realize the complete observation of the whole observation moving line, the center point of the field of view of the nacelle (N is illustrated in FIG. 3) needs to move on the observation moving line. The center point of the field of view of the nacelle refers to the center point of the field of view of the nacelle, AP in FIG. 3 means the current position of the unmanned aerial vehicle, AP #1 means the current position #1 of the unmanned aerial vehicle, AP #2 means the current position #2 of the unmanned aerial vehicle and so on.

In some embodiments, prior to the aforementioned step S10, the method S100 further comprises:

(1) Acquiring a mapping relationship between the observation flight leg and the observation interval.
(2) Determining the observation interval corresponding to the observation flight leg according to the mapping relationship and the observation flight leg.
(3) Determining all of the observation flight legs associated with the observation interval based on the mapping relationship and the observation interval.
(4) Determining the sum of the flight range of all of the observation flight legs as the total flight range corresponding to the observation interval.

It would be appreciated that the observation moving line and flight route could be determined prior to the automated inspection of the inspection object. The flight route may be automatically generated based on the observation moving line, or manually set by the operator. The flight route is divided into a plurality of observation flight legs, and in some embodiments, a worker may pre-set a mapping relationship between the observation flight legs and the observation interval, and store the same in the storage chip of the unmanned aerial vehicle for the processor to call for acquisition. Wherein the mapping relationship satisfies: each observation flight leg is associated with at most one observation interval, and one observation interval may correspond to one observation flight leg.

Figure 4:
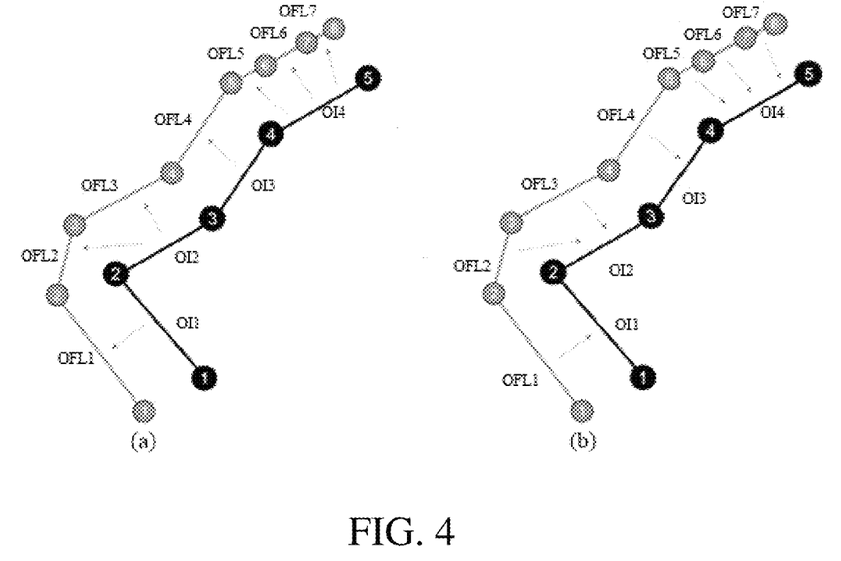
FIG. 4 is a schematic diagram of a mapping between flight legs and observation intervals in some embodiments of the present application.

With reference to FIG. 4, (a) in FIG. 4 is a schematic diagram of an observation interval corresponding to an observation flight leg, and (b) in FIG. 4 is a schematic diagram of an observation interval corresponding to an observation flight leg. As shown in (a) of FIG. 4, the observation flight legs corresponding to the observation intervals 4 (OI4 is illustrated in FIG. 4) include an observation flight leg 5 (OFL5 is illustrated in FIG. 4, an observation flight leg 6 (OFL6 is illustrated in FIG. 4), and an observation flight leg 7 (OFL7 is illustrated in FIG. 4). Thus, the observation interval corresponding to the observation flight leg can be determined according to the mapping relationship and the observation flight leg. As shown in (b) of FIG. 4, observation flight leg 1 (OFL1 is illustrated in FIG. 4) corresponds to observation interval 1 (OI1 is illustrated in FIG. 4), observation flight leg 2 (OFL2 is illustrated in FIG. 4) and observation flight leg 3 (OFL3 is illustrated in FIG. 4) correspond to observation interval 2 (OI2 is illustrated in FIG. 4), observation flight leg 4 (OFL4 is illustrated in FIG. 4) corresponds to observation interval 3 (OI3 is illustrated in FIG. 4), observation flight leg 5 (OFL5 is illustrated in FIG. 4), observation flight leg 6 (OFL6 is illustrated in FIG. 4) and observation flight leg 7 (OFL7 is illustrated in FIG. 4) all correspond to observation interval 4 (OI4 is illustrated in FIG. 4).

Based on the observation interval possibly corresponding to one or more observation flight legs, all observation flight legs associated with the observation interval can thus be determined from the mapping relationship and the observation interval. For example, all observation flight legs associated with observation interval 4 include observation flight leg 5, observation flight leg 6, and observation flight leg 7.

Finally, the sum of the flight range of all of the observation flight legs is determined as the total flight range corresponding to the observation interval. For example, the total flight range corresponding to observation interval 4 is the sum of the flight range of observation flight leg 5, the flight range of observation flight leg 6, and the flight range of observation flight leg 7.

In this embodiment, by setting the above-mentioned mapping relationship, after knowing the observation flight leg in which the unmanned aerial vehicle is currently located, the observation interval in which the unmanned aerial vehicle is currently located can be quickly found out, and after knowing the observation interval in which the unmanned aerial vehicle is currently located, all the observation flight legs associated with the observation interval can be quickly found out, and the total flight range corresponding to the observation interval can be calculated and obtained.

S20: determining an observation progress of the unmanned aerial vehicle based on the current flight range and the total flight range.

It can be seen from the above that each observation interval corresponds to at least one observation flight leg. Based on that the total flight range refers to the total mileage of at least one observation flight leg corresponding to the observation interval, and the current flight range refers to the mileage of the total flight of the unmanned aerial vehicle on the at least one observation flight leg corresponding to the observation interval, and the flight range is associated with the observation progress, so that the observation progress of the unmanned aerial vehicle can be determined according to the current flight range and the total flight range. It can be understood that the observation progress refers to the degree of completion of the inspection of the current observation interval by the unmanned aerial vehicle. For example, when the current flight range is half of the total flight range, the extent to which the shooting field of view sweeps the observation interval may be greater than 50%, so the observation progress may be 60%.

Figure 5:
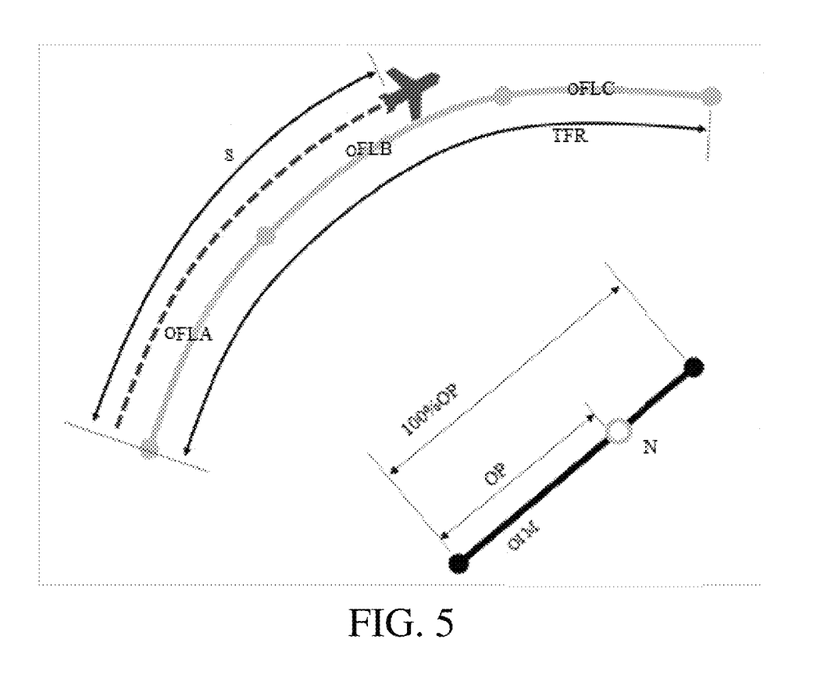
FIG. 5 is a schematic diagram of a current flight range and observation progress in some embodiments of the present application.

In some embodiments, the aforementioned step S20 specifically includes:

S21: determining a flight progress of the unmanned aerial vehicle based on the current flight range (S is illustrated in FIG. 5) and the total flight range (TFR is illustrated in FIG. 5).

The flight progress is an index for evaluating how much the unmanned aerial vehicle flies on at least one flight leg corresponding to the current observation interval. Based on the definition of the current flight range and the total flight range, the flight progress of the unmanned aerial vehicle can be determined according to the current flight range and the total flight range.

In some embodiments, the aforementioned step S21 specifically includes: determining a first ratio of the current flight range to the total flight range (TFR is illustrated in FIG. 5) as a flight progress of the unmanned aerial vehicle.

In this embodiment, the flight progress of the unmanned aerial vehicle in an observation interval is the ratio of the current flight range of the unmanned aerial vehicle in the observation interval to the total flight range (TFR is illustrated in FIG. 5) corresponding to the observation interval. The current flight range can be calculated by integrating the flight speed over time.

In some embodiments, the method S100 further comprises:

(1) acquiring a flight speed of the unmanned aerial vehicle in the observation flight leg;
(2) calculating the current flight range corresponding to the observation interval by the following formula:

$$S = \int_0^t V dt$$

wherein S is the current flight range corresponding to the observation interval, t is the time from the start of observing the observation interval to the current position of the unmanned aerial vehicle, and V is the flight speed of the unmanned aerial vehicle.

For example, referring to FIG. 5, in FIG. 5, the observation interval M (OI M is illustrated in FIG. 5) corresponds to the observation flight leg A (OFLA is illustrated in FIG. 5), the observation flight leg B (OFLB is illustrated in FIG. 5), and the observation flight leg C(OFLC is illustrated in FIG. 5), and when the unmanned aerial vehicle is located at the starting point of the observation flight leg A, the integration of the flight speed time is started, and the current flight range S(S is illustrated in FIG. 5) is calculated. The flight speed is the real flight speed of the unmanned aerial vehicle acquired in real time.

In this embodiment, the current flight range S can be accurately obtained by real time integration of the flight speed of the unmanned aerial vehicle in the observation flight leg.

It will be appreciated that in some embodiments when the unmanned aerial vehicle observes a new observation interval, the flight progress, current flight range, and observation progress of the unmanned aerial vehicle are all recalculated from zero. That is, starting from the starting point coordinate of the new observation interval, recalculating the current flight range and observation progress corresponding to the new observation interval, so as to make the data corresponding to each observation interval accurate, and facilitating subsequent accurate adjustment of the gimbal angle.

S22: determining an observation progress of the unmanned aerial vehicle according to the flight progress.

Referring again to FIG. 5, it will be appreciated that there is a positive correlation between flight progress and observation progress (OP is illustrated in FIG. 5). Thus, the observation progress of the unmanned aerial vehicle can be determined according to the flight progress based on the correlation between the flight progress and the observation progress. In some embodiments, the flight progress may be used coarsely as observation progress.

In some embodiments, the aforementioned step S22 specifically includes: determining a second ratio of the flight progress to a preset coefficient as an observation progress of the unmanned aerial vehicle, wherein the preset coefficient is less than or equal to 1.

It will be appreciated that, with reference to FIG. 6, the shooting field of view based on the shooting equipment is directed below the unmanned aerial vehicle, and the shape thereof is a rectangle larger than that of the unmanned aerial vehicle, and when the unmanned aerial vehicle flies to the current flight range, the shooting field of view sweeps more than the current flight range, for example, when the flight progress reaches 50%, the observation progress may reach 60%.

In this embodiment, the preset coefficient is set as a proportional relationship between the flight progress and the observation progress. In consideration of the above-mentioned characteristic of the relationship between the flight progress and the observation progress, the proportional relationship between the observation progress and the flight progress is appropriately relaxed, and the preset coefficient is set to be less than or equal to 1. For example, if 100% of the observation progress (100% OP is illustrated in FIG. 5) only needs to correspond to 90% of the flight progress, the preset coefficient may be set to 0.9. When the current flight range of the unmanned aerial vehicle flying on the observation flight leg corresponding to the observation interval M reaches 90%, namely, the flight progress reaches 90%, the calculated observation progress has reached 1, and at this moment, the shooting field of view has completed sweeping the observation interval M.

In this embodiment, based on the correlation between the flight progress and the observation progress, the observation progress of the unmanned aerial vehicle can be accurately determined according to the flight progress. Appropriately relaxing the proportional relationship between the observation progress and the flight progress, and setting the preset coefficient to be less than or equal to 1, thereby determining the second ratio of the flight progress to the preset coefficient as the observation progress of the unmanned aerial vehicle, not only making the observation progress accurate, but also ensuring that every place on the observation interval can be observed and shot.

S30: determining a first position according to the observation progress and the observation interval, wherein the first position is a target position of a center point of a field of view of a nacelle of the unmanned aerial vehicle.

It is to be understood that the shooting field of view of the shooting equipment is directed below the unmanned aerial vehicle and is shaped as a rectangle larger than the unmanned aerial vehicle. In this step, the center point of the field of view of the nacelle is the rectangular center of the shooting field of view.

Figure 6:
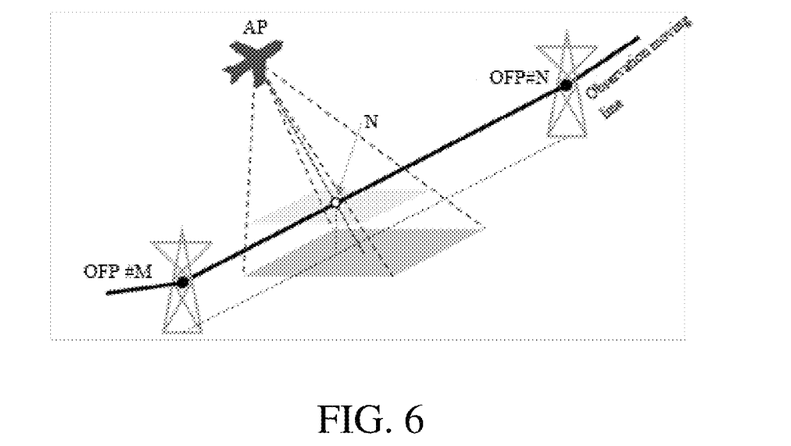
FIG. 6 is a schematic diagram of the center of the field of view of the nacelle on the observation interval in some embodiments of the present application.

Referring to FIG. 6, in order to enable the shooting field of view to completely cover the width of the observation moving line in real time, the center point of the field of view of the nacelle (N is illustrated in FIG. 6) can be moved on the line connecting the starting point coordinate and the ending point coordinate of each observation interval. It will be understood that the width of the observation moving line refers to viewing the transverse width of the moving line. In the above-mentioned patrol inspection example of a high-voltage power transmission line, the width of the observation moving line is the distance between two cables with the farthest transverse distance of the power transmission cable.

Thus, the target position (the first position) of the center point of the nacelle visual field of the unmanned aerial vehicle is determined in real time according to the observation progress and the observation interval, and if there is an offset between the current position of the center point of the nacelle visual field and the target position, the current position is adjusted to the target position in time, so that the center point of a field of view of the nacelle can move on the line connecting the starting point coordinate and the ending point coordinate of the observation interval.

In some embodiments, the aforementioned step S30 specifically includes:

S31: acquiring a starting point (OFP #M is illustrated in FIG. 6,7) coordinate and an ending point (OFP #N is illustrated in FIG. 6,7) coordinate of the observation interval.

S32: determining a first unit vector pointing from a starting point of the observation interval to an ending point of the observation interval according to the starting point coordinate and the ending point coordinate.

S33: calculating the coordinates of the first position by the following formula:

$$P = s + vec \times present$$

wherein P is a coordinate of the first position, s is the starting point coordinate, vec is the first unit vector and present is the observation progress.

Figure 7:
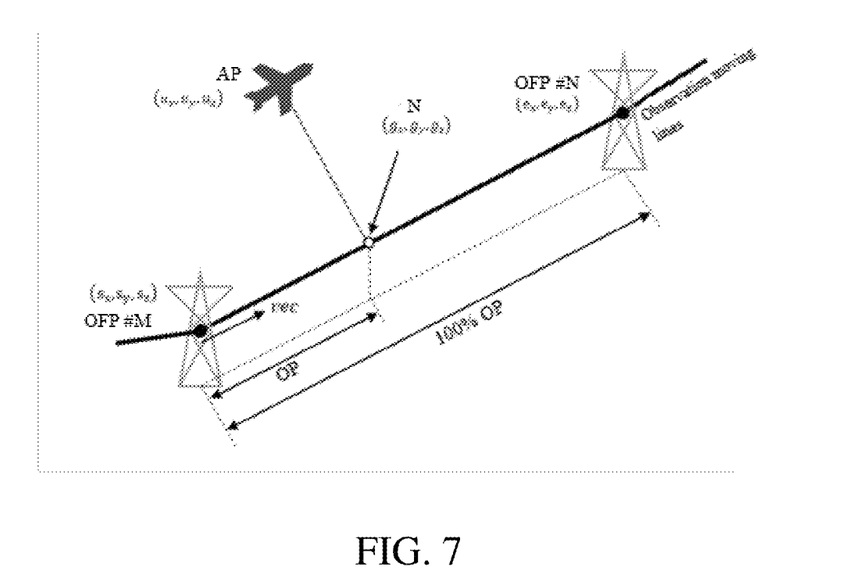
FIG. 7 is a schematic diagram of the target position at the center of the field of view of the nacelle in some embodiments of the present application.

Referring to FIG. 7, the starting point coordinate of the observation interval is $s=(S_x, S_y, S_z)$, the ending point coordinate is $e=(e_x, e_y, e_z)$, and the current observation progress of the unmanned aerial vehicle is present. In some embodiments, to calculate the first unit vector, first, the distance $$|e - s| = \sqrt{(s_x - e_x)^2 + (s_y - e_y)^2 + (s_z - e_z)^2}$$

between the starting point coordinate and the ending point coordinate is calculated, and then the first unit vector $$vec = \frac{(e - s)}{|e - s|}$$

is calculated.

After the first unit vector is acquired, when the starting point coordinate s is known, the coordinate of the first position, i.e. the target position of the center point of the field of view of the nacelle (N is illustrated in FIG. 6,7), can be accurately calculated using the above formula as the observation progress progresses In this embodiment, the coordinates of the first position, i.e. the target position at the center point of the field of view of the nacelle, can be accurately determined in the manner described above.

S40: controlling an angle of the gimbal of the unmanned aerial vehicle according to the first position and a current position of the unmanned aerial vehicle (AP is illustrated in FIG. 6,7).

The "current position of the unmanned aerial vehicle (AP is illustrated in FIG. 6,7)" is the coordinate position of the unmanned aerial vehicle in the three-dimensional space at the current moment. After the current position of the unmanned aerial vehicle and the target position of the center point of the field of view of the nacelle is known, the control instruction of the gimbal can be calculated to control the angle of the gimbal.

In some embodiments, the aforementioned step S40 specifically includes:

S41: determining a second unit vector pointing from the current position of the unmanned aerial vehicle to the first position according to the coordinates of the first position and the coordinates of the current position of the unmanned aerial vehicle.

S42: determining a pitch angle and a yaw angle of the gimbal according to the second unit vector.

S43: controlling an angle of the gimbal according to the pitch angle and the yaw angle.

For example, if the coordinate of the current position of the unmanned aerial vehicle is $P=(u_x, u_y, u_z)$, and the coordinate of the first position is $G=(g_x, g_y, g_z)$, firstly, a vector pointing from the current position of the unmanned aerial vehicle to the first position $\overrightarrow{GP}$ is calculated using the following formula:

$$\overrightarrow{GP} = G - P = (g_x - u_x, g_y - u_y, g_z - u_z)$$

Then, a second unit vector $$e = \frac{\overrightarrow{GP}}{|GP|} = (e_1, e_2, e_3)$$

pointing from the current position of the unmanned aerial vehicle to the first position is calculated.

Use the following formula to calculate the pitch angle $\theta_{Gim}$ and yaw angle $\psi_{Gim}$ of gimbal:

$$\theta_{Gim} = \text{atan2}(e_2, e_1)$$
$$\psi_{Gim} = \text{asin}(e_3)$$

Finally, the angle of the gimbal is controlled according to the pitch angle and the yaw angle so that the center point of the field of view of the nacelle is adjusted from the current position to the target position so that it can be ensured that the center point of the field of view of the nacelle can move on the line connecting the starting point coordinate and the ending point coordinate of the observation interval.

In this embodiment, the pitch angle and the yaw angle of the gimbal are determined by the current position of the unmanned aerial vehicle pointing to the second unit vector of the first position, and then the angle of the gimbal is controlled according to the pitch angle and the yaw angle, so that the center point of the field of view of the nacelle can be adjusted from the current position to the target position, thereby ensuring that the center point of the field of view of the nacelle can move on the connecting line of the starting point coordinate and the ending point coordinate of the observation interval, so as to completely cover the width of the observation moving line in real time.

In some embodiments, when the unmanned aerial vehicle performs a temporary task, the method further comprises:
(1) If the unmanned aerial vehicle performs a temporary task in a current flight route, continuing to perform the above step of determining a flight progress of the unmanned aerial vehicle based on the current flight range and the total flight range until the temporary task ending.
(2) If the unmanned aerial vehicle flies away from the current flight route to perform a temporary task, latching the flight progress of the current unmanned aerial vehicle until the temporary task ending.

Under normal circumstances, the unmanned aerial vehicle performs the normal inspection task in the process of flying along the flight route, the center point of the field of view of the nacelle moves on the observation moving line and realizes the automatic observation action on the observation moving line.

It will be appreciated that in actual flight, the unmanned aerial vehicle may need to perform other temporary tasks in the event of finding an area having a special situation of the path, such as gimbal locking to observe an area or the unmanned aerial vehicle flies off the flight route for other tasks.

In order to adapt to these emergency operations, the flight progress is dealt with in two cases, one is that the unmanned aerial vehicle does not fly away from the original flight route while performing the temporary task, and the other is that the unmanned aerial vehicle needs to leave the original flight route.

Figure 8:
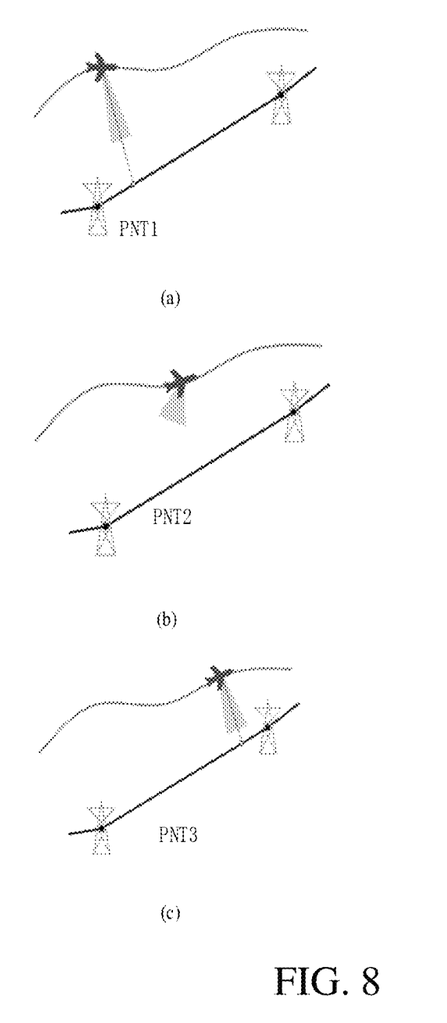
FIG. 8 is a schematic diagram of an unmanned aerial vehicle performing a temporary task in some embodiments of the present application.

Specifically, referring to (a) to (c) in FIG. 8, PNT1 is illustrated in FIG. 8(a): The unmanned aerial vehicle performs the normal inspection task, and the center of the field of view of the nacelle moves on the observation moving line; PNT2 is illustrated in FIG. 8(b): The unmanned aerial vehicle flies on the inspection flight route, but the center of the field of view of the nacelle is away from the observation moving line to observe other targets; PNT3 is illustrated in FIG. 8(c): The unmanned aerial vehicle returns to perform the inspection task, the center of the field of view of the nacelle returns to the observation moving line, and the observation progress is calculated by using the latest position of the unmanned aerial vehicle; if the unmanned aerial vehicle performs a temporary task with the current flight route, for example, the gimbal station may not continue to automatically observe the observation moving line under the control of other instructions during the flight, but since the unmanned aerial vehicle is also flying on the flight route, in this case, the flight progress of the unmanned aerial vehicle does not stop the calculation, namely, the above-mentioned step of determining the flight progress of the unmanned aerial vehicle according to the current flight range and the total flight range is continued until the temporary task ends. Therefore, it can effectively ensure that the unmanned aerial vehicle can normally observe its corresponding observation interval when it returns to the flight route for observation.

Figure 9:
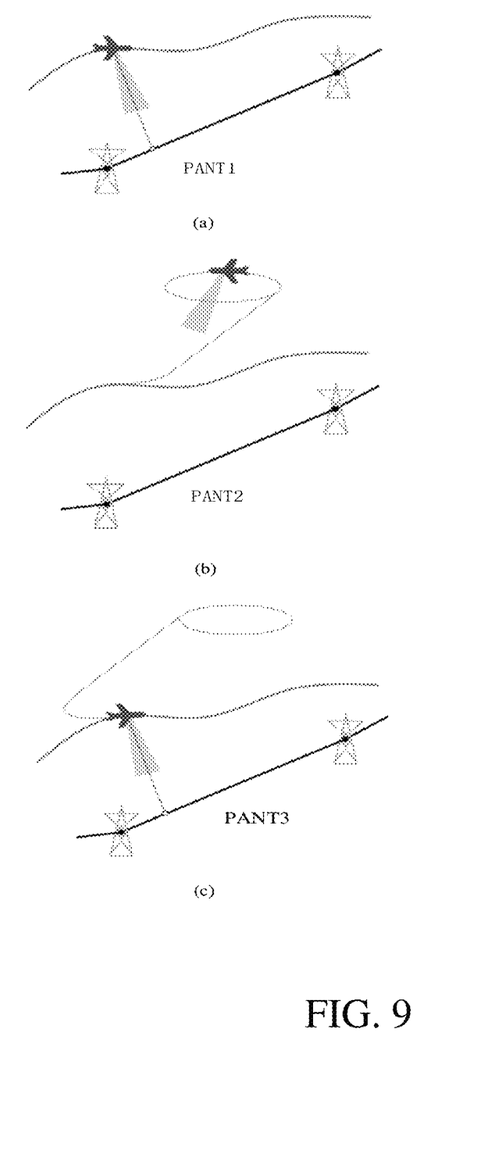
FIG. 9 is a schematic diagram of an unmanned aerial vehicle performing a temporary task in some embodiments of the present application.

Referring to (a) to (c) in FIG. 9, PANT1 is illustrated in FIG. 9(a): The unmanned aerial vehicle performs the normal inspection task, and the center of the field of view of the nacelle moves on the observation moving line; PANT2 is illustrated in FIG. 9(b): The unmanned aerial vehicle exits from the inspection task and performs a temporary task, and the center of the field of view of the nacelle is not on the observation moving line; FIG. 9(c): PANT3 is illustrated in FIG. 9(c): The unmanned aerial vehicle returns to the inspection task from the temporary task, continues to observe the center of the field of view of the nacelle from the breakpoint and returns to the observation moving line; if the unmanned aerial vehicle flies away from the current flight route to perform a temporary task, the flight progress of the current unmanned aerial vehicle is latched, and the calculation is continued from the latched flight progress when returning to the original flight route from other tasks so that it can be ensured that the unmanned aerial vehicle can also continue to be observed from the flying-away position when returning to the flight route from outside the flight route.

In this embodiment, for the unmanned aerial vehicle to perform temporary tasks, processing is divided into the above two cases, so that the unmanned aerial vehicle can still smoothly return to the original flight route to continue to perform observation and inspection tasks after handling special cases.

In some embodiments, the foregoing determining an observation progress of the unmanned aerial vehicle based on the current flight range and the total flight range comprises:
determining a flight progress of the unmanned aerial vehicle based on the current flight range and the total flight range;
determining an observation progress of the unmanned aerial vehicle according to the flight progress.

In some embodiments, the foregoing determining a flight progress of the unmanned aerial vehicle based on the current flight range and the total flight range comprises:
determining a first ratio of the current flight range to the total flight range as a flight progress of the unmanned aerial vehicle.

In some embodiments, the foregoing determining an observation progress of the unmanned aerial vehicle according to the flight progress comprises:
determining a second ratio of the flight progress to a preset coefficient as an observation progress of the unmanned aerial vehicle, wherein the preset coefficient is less than or equal to 1.

In some embodiments, the foregoing determining a first position based on the observation progress and the observation interval comprises:
acquiring a starting point coordinate and an ending point coordinate of the observation interval;
determining a first unit vector pointing from a starting point of the observation interval to an ending point of the observation interval according to the starting point coordinate and the ending point coordinate;
calculating the coordinates of the first position by the following formula:

$$P = s + vec \times present$$

wherein P is a coordinate of the first position, s is the starting point coordinate, and vec is the first unit vector and is the observation progress.

In some embodiments, the foregoing controlling an angle of a gimbal of the unmanned aerial vehicle according to the first position and the current position of the unmanned aerial vehicle comprises:

determining a second unit vector pointing from the current position of the unmanned aerial vehicle to the first position according to the coordinates of the first position and the coordinates of the current position of the unmanned aerial vehicle;

determining a pitch angle and a yaw angle of the gimbal according to the second unit vector;

controlling the angle of the gimbal according to the pitch angle and the yaw angle.

In some embodiments, prior to acquiring inspection information for an unmanned aerial vehicle, the method further comprises:

acquiring a mapping relationship between the observation flight leg and the observation interval;

determining the observation interval corresponding to the observation flight leg according to the mapping relationship and the observation flight leg;

determining all of the observation flight legs associated with the observation interval based on the mapping relationship and the observation interval;

determining the sum of the flight range of all of the observation flight legs as the total flight range corresponding to the observation interval.

In some embodiments, the method further comprises:

acquiring a flight speed of the unmanned aerial vehicle in the observation flight leg;

calculating the current flight range corresponding to the observation interval by the following formula:

$$S = \int_0^t Vdt$$

wherein S is the current flight range corresponding to the observation interval, t is the time from the start of observing the observation interval to the current position of the unmanned aerial vehicle, and V is the flight speed of the unmanned aerial vehicle.

In some embodiments, the flight progress, the current flight range, and the observation progress of the unmanned aerial vehicle are recalculated from zero when the unmanned aerial vehicle observes a new observation interval.

In some embodiments, when the unmanned aerial vehicle performs a temporary task, the method further comprises:

if the unmanned aerial vehicle performs a temporary task in a current flight route, continuing to perform the step of determining a flight progress of the unmanned aerial vehicle based on the current flight range and the total flight range until the temporary task ending;

if the unmanned aerial vehicle flies away from the current flight route to perform a temporary task, latching the flight progress of the current unmanned aerial vehicle until the temporary task ending.

In summary, the embodiment of the present application provides a central gimbal control method, which is applied to an unmanned aerial vehicle, and acquires inspection information about the unmanned aerial vehicle, wherein the inspection information comprises an observation flight leg, an observation interval corresponding to the observation flight leg, a total flight range corresponding to the observation interval and a current flight range. Then, the observation progress of the unmanned aerial vehicle is determined according to the current flight range and the total flight range. A first position is determined according to the observation progress and the observation interval, wherein the first position is the position of the center point of the field of view of the nacelle of the unmanned aerial vehicle. Finally, the angle of the gimbal of the unmanned aerial vehicle is controlled according to the first position and the current position of the unmanned aerial vehicle. In this embodiment, in an above-mentioned manner, the inspection object is divided into a plurality of observation intervals; for each observation interval, according to the observation progress (flight progress), a first position (a target position of the observation center of the pod) which can fall on the observation interval is calculated in real time; then, the angle of the gimbal of the unmanned aerial vehicle is controlled based on the first position, so as to automatically adjust the angle of the gimbal, so that the adjusted position of the observation center of the nacelle is located at the first position so that the current shooting field of view is adapted to the observation interval. Therefore, when the inspection is completed, the entire shooting field of view can completely cover the inspection object, the inspection object can be self-adaptive, and the inspection object can be completely observed to effectively avoid the risk of missing inspection and improve the inspection efficiency.

With reference to FIG. 10, FIG. 10 is a schematic diagram of the structure of a gimbal control device according to an embodiment of the present application. Wherein the gimbal control device is applied to an unmanned aerial vehicle, and in particular, the gimbal control device is applied to one or more processors of the unmanned aerial vehicle.

As shown in FIG. 10, the gimbal control device 200 comprises an acquisition module 201, an observation progress determination module 202, a first position determination module 203, and a control module 204.

The acquisition module 201 is used for acquiring inspection information about the unmanned aerial vehicle, wherein the inspection information comprises an observation flight leg, an observation interval corresponding to the observation flight leg, a total flight range corresponding to the observation interval, and a current flight range. The observation progress determination module 202 is used for determining the observation progress of the unmanned aerial vehicle based on the current flight range and the total flight range. The first position determination module 203 is used for determining a first position according to the observation progress and the observation interval, wherein the first position is a target position of a center point of a field of view of a nacelle of the unmanned aerial vehicle. The control module 204 is used for controlling the angle of a gimbal of the unmanned aerial vehicle according to the first position and the current position of the unmanned aerial vehicle.

In the embodiments of the present application, the gimbal control device may also be built by hardware devices; for example, the gimbal control device may be built by one or more chips, and each chip may work in coordination with each other to complete the gimbal control method described in the above-mentioned embodiments. As another example, the gimbal control device may be built from various types of logic devices, such as a general purpose processor, a digital signal processor (DSP), an application specific integrated circuit (ASIC), a field programmable gate array (FPGA), a single chip microcomputer, a ARM (Acorn RISC Machine)

or other programmable logic device, discrete gate or transistor logic, discrete hardware components, or any combination thereof.

The gimbal control device of the embodiment of the present application may be a device having an operating system. The operating system may be an Android operating system, may be an ios operating system, and may also be other possible operating systems, and the embodiments of the present application are not particularly limited.

The gimbal control device according to the embodiments of the present application can realize the various processes that can be realized by the above-mentioned gimbal control method, and in order to avoid repetition, the description thereof will not be repeated here.

It should be noted that the above-mentioned gimbal control device can perform the gimbal control method provided by the embodiments of the present application and has functional modules and beneficial effects corresponding to the execution method. For technical details not described in detail in the embodiment of the gimbal control device, reference can be made to the gimbal control method provided in the embodiment of the present application.

A controller is also provided according to an embodiment of the present application. With reference to FIG. 11, FIG. 11 is a schematic diagram of the hardware structure of a controller provided according to an embodiment of the present application.

As shown in FIG. 11, the controller 300 includes at least one processor 301 and memory 302 communicatively connected (in FIG. 11, a bus connection, one processor for example).

Wherein the processor 301 is used for providing calculation and control capabilities to control the controller 300 to perform corresponding tasks, for example, controlling the controller 300 to perform a gimbal control method in any one of the above-mentioned method embodiments, the method comprising: acquiring inspection information about the unmanned aerial vehicle, wherein the inspection information comprises an observation flight leg, an observation interval corresponding to the observation flight leg, a total flight range corresponding to the observation interval and a current flight range. determining an observation progress of the unmanned aerial vehicle based on the current flight range and the total flight range. determining a first position according to the observation progress and the observation interval, wherein the first position is a target position of a center point of a field of view of a nacelle of the unmanned aerial vehicle. controlling an angle of a gimbal of the unmanned aerial vehicle according to the first position and the current position of the unmanned aerial vehicle.

In this embodiment, for each observation interval, according to the observation progress (flight progress), the controller calculates in real time a first position (a target position of the observation center of the nacelle) which can fall on the observation interval, and then controls the angle of the gimbal of the unmanned aerial vehicle based on the first position, so as to automatically adjust the angle of the gimbal, so that the adjusted position of the observation center of the nacelle is located at the first position so that the current shooting field of view is adapted to the observation interval. Therefore, when the inspection is completed, the entire shooting field of view can completely cover the inspection object, the inspection object can be self-adaptive, and the inspection object can be completely observed to effectively avoid the risk of missing inspection and improve the inspection efficiency.

The processor 301 can be a general-purpose processor, including a central processing unit (CPU), a network processor (NP), a hardware chip, or any combination thereof; It may also be a digital signal processing (DSP), an application specific integrated circuit (ASIC), a programmable logic device (PLD) or a combination thereof. The PLD may be a complex programmable logic device (CPLD), a field-programmable gate array (FPGA), generic array logic, (GAL), or any combination thereof.

As a non-transitory computer-readable storage medium, the memory 302 can be used for storing a non-transitory software program, a non-transitory computer-executable program, and modules, such as program instructions/modules corresponding to the gimbal control method in the embodiment of the present application. The processor 301 may implement the gimbal control method in any of the method embodiments described above by running non-transient software programs, instructions, and modules stored in the memory 302, which are not described in detail herein to avoid redundancy.

In particular, the memory 302 may include volatile memory (VM), such as random access memory (RAM); The memory 302 may also comprise non-volatile memory (NVM), such as read-only memory (ROM), flash memory, hard disk drive, (HDD) or solid-state drive (SSD) or other non-transient solid-state storage devices; The memory 302 may also comprise a combination of memories of the kind described above.

In the embodiment of the present disclosure, the memory 302 may further include memory remotely located with respect to the processor, which may be connected to the processor via a network. Examples of such networks include, but are not limited to, the Internet, intranets, local area networks, mobile communication networks, and combinations thereof.

It should be noted that the above-mentioned controller can perform the gimbal control method provided by the embodiments of the present application and has functional modules and beneficial effects corresponding to the execution method. For technical details not described in detail in the embodiment of the controller, reference can be made to the gimbal control method provided in the embodiment of the present application.

An embodiment of the present application also provides an unmanned aerial vehicle, comprising a gimbal and a controller in the above-mentioned embodiment, wherein the controller is used for controlling the angle of the gimbal. Wherein the gimbal is a support equipment for mounting the shooting equipment. Specifically, the shooting equipment or other sensor is housed in a nacelle and mounted on a gimbal.

Based on the controller, for each observation interval, according to the observation progress (flight progress), a first position (a target position of the observation center of the nacelle) that can fall on the observation interval is calculated in real time, and then the angle of the gimbal of the unmanned aerial vehicle is controlled based on the first position, so as to automatically adjust the angle of the gimbal so that the adjusted position of the observation center of the nacelle is located at the first position so that the current shooting field of view is adapted to the observation interval. Therefore, when the inspection is completed, the entire shooting field of view can completely cover the inspection object, the inspection object can be self-adaptive, and the inspection object can be completely observed to effectively avoid the risk of missing inspection and improve the inspection efficiency.

Therefore, the unmanned aerial vehicle can also adjust the gimbal angle in real time in the process of patrol, self-adapt the inspection object, make a complete observation of the inspection object, effectively avoid the risk of missed detection, and improve the efficiency of patrol.

The embodiment of the present application also provides an unmanned aerial vehicle inspection system, comprising: A plurality of ground monitoring stations and an unmanned aerial vehicle in the above-mentioned embodiment. The ground monitoring station is communicatively connected to the unmanned aerial vehicle, wherein the wireless network may be a Bluetooth network, a WiFi network, a wireless cellular network, or a combination thereof, and is not limited thereto.

The unmanned aerial vehicle is used for inspecting an observation interval on an observation moving line and transmitting image information about the observed moving line and inspection information acquired during the inspection to a ground monitoring station so that the ground monitoring station controls the unmanned aerial vehicle. Specifically, the observation moving line may be determined prior to automated inspection of the inspection object. When inspecting the observation interval on the observation moving line, the unmanned aerial vehicle transmits the image information about the observation moving line and the inspection information acquired during the inspection to the ground monitoring station. Thus, the ground monitoring station can display image information to help the staff know the detection situation of the inspection objects in time. In addition, the operator can control the operation of unmanned aerial vehicles through the ground monitoring station.

Unmanned aerial vehicles can adjust the gimbal angle in real time in the process of patrol, self-adapt the inspection object, make a complete observation of the inspection object, effectively avoid the risk of missed detection, and improve the efficiency of patrol. Therefore, the unmanned aerial vehicle inspection system has the same function as the unmanned aerial vehicle, and the detailed description thereof will not be repeated here.

Embodiments of the present application also provide a computer-readable storage medium such as memory including program codes executable by a processor to perform the gimbal control method in the embodiments described above. For example, the computer-readable storage medium can be a read-only memory (ROM), a random access memory (RAM), a compact disc read-only memory (CDROM), a magnetic tape, a floppy disk, an optical data storage device, etc.

Embodiments of the present application also provide a computer program product comprising one or more program codes stored in a computer-readable storage medium. The processor of the electronic device reads the program code from the computer-readable storage medium, and the processor performs the program code to perform the method steps of the gimbal control method provided in the above embodiment.

It should be noted that the embodiments of the device described above are merely schematic, wherein the elements illustrated as separate elements may or may not be physically separated, and the elements shown as elements may or may not be physical elements, i.e. may be located in one place, or may also be distributed over a plurality of network elements. Some or all of the modules may be selected to achieve the objectives of the embodiments according to actual needs.

The present disclosure has at least the following advantageous effects compared to the prior art: the gimbal control method of the present disclosure, applied to an unmanned aerial vehicle, acquires inspection information about the unmanned aerial vehicle, wherein the inspection information comprises an observation flight leg, an observation interval corresponding to the observation flight leg, a total flight range corresponding to the observation interval and a current flight range. Then, the observation progress of the unmanned aerial vehicle is determined according to the current flight range and the total flight range. A first position is determined according to the observation progress and the observation interval, wherein the first position is the position of the center point of the field of view of the nacelle of the unmanned aerial vehicle. Finally, the angle of the gimbal of the unmanned aerial vehicle is controlled according to the first position and the current position of the unmanned aerial vehicle. In this embodiment, in the above-mentioned manner, the inspection object is divided into a plurality of observation intervals; for each observation interval, according to the observation progress (flight progress), a first position (a target position of the observation center of the pod) which can fall on the observation interval is calculated in real time; then, the angle of the gimbal of the unmanned aerial vehicle is controlled based on the first position, so as to automatically adjust the angle of the gimbal, so that the adjusted position of the observation center of the nacelle is located at the first position so that the current shooting field of view is adapted to the observation interval. Therefore, when the inspection is completed, the entire shooting field of view can completely cover the inspection object, the inspection object can be self-adaptive, and the inspection object can be completely observed to effectively avoid the risk of missing inspection and improve the inspection efficiency.

Finally, it should be noted that: the above embodiments are merely illustrative of the technical solutions of the present disclosure, rather than limiting it; Combinations of features in the above embodiments or in different embodiments are also possible within the spirit of the disclosure, the steps can be implemented in any order, and there are many other variations of the different aspects of the disclosure described above, which are not provided in detail for the sake of brevity; Although the present disclosure has been described in detail with reference to the foregoing embodiments, those skilled in the art will appreciate that: the technical solutions disclosed in the above-mentioned embodiments can still be amended, or some of the technical features thereof can be replaced by equivalents; However, these modifications or substitutions do not bring the essence of the corresponding technical solutions out of the scope of the technical solutions of the various embodiments of the present application.

What is claimed is:

1. A gimbal control method, applied to an unmanned aerial vehicle, comprising:
   acquiring inspection information about the unmanned aerial vehicle, wherein the inspection information comprises an observation flight leg, an observation interval corresponding to the observation flight leg, a total flight range corresponding to the observation interval, and a current flight range, wherein the observation flight leg is a flight leg configured to inspect the observation interval by the unmanned aerial vehicle;
   determining an observation progress of the unmanned aerial vehicle in response to the current flight range and the total flight range;
   determining a first position according to the observation progress and the observation interval, wherein the first position is a target position of a center point of a field of view of a nacelle of the unmanned aerial vehicle;

controlling an angle of the gimbal of the unmanned aerial vehicle according to the first position and a current position of the unmanned aerial vehicle.

2. The gimbal control method according to claim 1, wherein the determining the observation progress of the unmanned aerial vehicle in response to the current flight range and the total flight range comprises:

determining a flight progress of the unmanned aerial vehicle in response to the current flight range and the total flight range;

determining the observation progress of the unmanned aerial vehicle according to the flight progress.

3. The gimbal control according to claim 2, wherein the determining the flight progress of the unmanned aerial vehicle in response to the current flight range and the total flight range comprises:

determining a first ratio of the current flight range to the total flight range as the flight progress of the unmanned aerial vehicle.

4. The gimbal control method according to claim 2, wherein the determining the observation progress of the unmanned aerial vehicle according to the flight progress comprises:

determining a second ratio of the flight progress to a preset coefficient as the observation progress of the unmanned aerial vehicle, wherein the preset coefficient is less than or equal to 1.

5. The gimbal control method according to claim 2, wherein when the unmanned aerial vehicle performs a temporary task, the gimbal control method further comprises:

when the unmanned aerial vehicle performs the temporary task in a current flight route, continuing to perform the step of determining the flight progress of the unmanned aerial vehicle in response to the current flight range and the total flight range until the temporary task ending;

when the unmanned aerial vehicle flies away from the current flight route to perform the temporary task, latching the flight progress of the current unmanned aerial vehicle until the temporary task ending.

6. The gimbal control method according to claim 1, wherein the determining the first position in response to the observation progress and the observation interval comprises:

acquiring a starting point coordinate and an ending point coordinate of the observation interval;

determining a first unit vector pointing from a starting point of the observation interval to an ending point of the observation interval according to the starting point coordinate and the ending point coordinate;

calculating coordinates of the first position by the following formula:

$$P = s + vec \times present$$

wherein P is the coordinate of the first position, s is the starting point coordinate, vec is the first unit vector and present is the observation progress.

7. The gimbal control method according to claim 1, wherein the controlling an angle of the gimbal of the unmanned aerial vehicle according to the first position and the current position of the unmanned aerial vehicle comprises:

determining a second unit vector pointing from the current position of the unmanned aerial vehicle to the first position according to the coordinates of the first position and the coordinates of the current position of the unmanned aerial vehicle;

determining a pitch angle and a yaw angle of the gimbal according to the second unit vector;

controlling the angle of the gimbal according to the pitch angle and the yaw angle.

8. The gimbal control method according to claim 1, wherein before acquiring the inspection information of the unmanned aerial vehicle, the gimbal control method further comprises:

acquiring a mapping relationship between the observation flight leg and the observation interval;

determining the observation interval corresponding to the observation flight leg according to the mapping relationship and the observation flight leg;

determining all of the observation flight legs associated with the observation interval based on the mapping relationship and the observation interval;

determining the sum of the flight range of all of the observation flight legs as the total flight range corresponding to the observation interval.

9. The gimbal control method according to claim 8, further comprising:

acquiring a flight speed of the unmanned aerial vehicle in the observation flight leg;

calculating the current flight range corresponding to the observation interval by the following formula:

$$S = \int_0^t V dt$$

wherein S is the current flight range corresponding to the observation interval, t is a time from the start of observing the observation interval to the current position of the unmanned aerial vehicle, and V is the flight speed of the unmanned aerial vehicle.

10. The gimbal control method according to claim 9, wherein the flight progress, the current flight range, and the observation progress of the unmanned aerial vehicle are recalculated from zero when the unmanned aerial vehicle observes a new observation interval.

11. An unmanned aerial vehicle, comprising:

a gimbal and a controller, wherein the controller comprising:

at least one processor; and, a memory communicatively connected to the at least one processor; wherein, the memory stores instructions executable by the at least one processor, the instructions are executed by the at least one processor to enable the at least one processor to perform a gimbal control method;

wherein the gimbal control method comprising:

acquiring inspection information about the unmanned aerial vehicle, wherein the inspection information comprises an observation flight leg, an observation interval corresponding to the observation flight leg, a total flight range corresponding to the observation interval, and a current flight range, wherein the observation flight leg is a flight leg configured to inspect the observation interval by the unmanned aerial vehicle;

determining an observation progress of the unmanned aerial vehicle in response to the current flight range and the total flight range;

determining a first position according to the observation progress and the observation interval, wherein the first position is a target position of a center point of a field of view of a nacelle of the unmanned aerial vehicle;

controlling an angle of the gimbal of the unmanned aerial vehicle according to the first position and a current position of the unmanned aerial vehicle.

12. The unmanned aerial vehicle according to claim 11, wherein the determining the observation progress of the unmanned aerial vehicle in response to the current flight range and the total flight range comprises:

determining a flight progress of the unmanned aerial vehicle in response to the current flight range and the total flight range;

determining the observation progress of the unmanned aerial vehicle according to the flight progress.

13. The unmanned aerial vehicle according to claim 11, wherein the determining the flight progress of the unmanned aerial vehicle in response to the current flight range and the total flight range comprises:

determining a first ratio of the current flight range to the total flight range as the flight progress of the unmanned aerial vehicle.

14. The unmanned aerial vehicle according to claim 13, wherein the determining the observation progress of the unmanned aerial vehicle according to the flight progress comprises:

determining a second ratio of the flight progress to a preset coefficient as the observation progress of the unmanned aerial vehicle, wherein the preset coefficient is less than or equal to 1.

* * * * *